Patented July 2, 1929.

1,719,523

UNITED STATES PATENT OFFICE.

WILLIAM A. STEPHENS, OF WASHINGTON, DISTRICT OF COLUMBIA.

SOLUTION OF IODINE AND METHOD OF MAKING THE SAME.

No Drawing. Application filed May 31, 1918, Serial No. 237,581. Renewed May 20, 1926.

This invention relates to solutions of iodine, and has for its object to provide an improved product having at least the usual therapeutic properties of iodine, and in addition thereto other new and useful properties and advantages, such for instance as absence of causticity; reduction in staining effect; lack of hardening effect upon tissue; solubility in and miscibility with water; of pleasing taste when diluted with water; and other marked characteristics as will be hereinafter set forth.

In carrying out my invention I take iodine crystals and a suitable solvent, for instance alcohol, and place them in a flask. I then heat the flask to simultaneously vaporize the iodine and alcohol, and subsequently condense the vapor and thereby obtain the product in the form of an iodine solution.

I have found it important to heat the mixture gradually so as to avoid a too sudden vaporization of the iodine and in order that a substantially simultaneous vaporization of the iodine and alcohol may take place.

Good results have been obtained from the use of 25% iodine crystals and 75% alcohol, but I do not wish to be understood as limiting myself to this proportion, as good results have also been obtained by the use of different proportions.

It will here be explained that I employ iodine and a solvent only, and by the use of a distilling step, I am able to obtain the product without the use of any chemical as a solution promoter such as potassium iodide, hydrogen iodide, etc. as commonly employed in the manufacture of commercial tincture of iodine. By eliminating the use of a solution promoter, which is ordinarily highly caustic, my product is therefore free from the causticity which is present in ordinary tincture of iodine due to the use of solution promoters. Furthermore I have found that the distilling step also materially reduces if not actually destroys the native causticity of the iodine itself, without destroying or in any way impairing the therapeutic effects of the iodine.

In the practice of my method I preferably maintain an excess of iodine at all times during the distillation operation in order to increase the iodine content of the resulting product. Furthermore the distillate may be vaporized in the presence of iodine to further increase the iodine content. In this connection the original and subsequent distillation or distillations may be carried out under reflux conditions i. e. by the use of a still including a reflux condenser.

An iodine solution made in accordance with the foregoing disclosure will be found to be practically non-caustic when applied to tissue, and when so applied there is little or no hardening effect upon the tissue so noticeable with ordinary commercial tincture of iodine, and the staining effect upon the tissue is very materially reduced.

The new solution has been found to be readily soluble in and miscible with water. When diluted with water to a strength suitable for dental purposes, the product will be found to have a pleasant sweetish taste.

After the solution has been prepared, glycerine may be added thereto for the purpose of preventing too rapid volatilization of the iodine. Good results have been obtained by the use of a 10% addition.

As a result of the process described a product is obtained containing ethylene iodide in the presence of free iodine. Ethylene iodide is an unstable compound and will break down in contact with the air, liberating iodine in a nascent state. However, in the presence of a certain amount of free iodine, ethylene iodide will not break down.

When the new antiseptic is applied to the tissue, free iodine is liberated. The free iodine thus liberated arrests the breaking down of the ethylene iodide. As the free iodine becomes dissipated, ethylene iodide again breaks down, liberating a further quantity of free iodine. There is thus a cyclic action taking place in contact with the tissue until all of the ethylene iodide has broken down and the free iodine becomes dissipated.

The antiseptic value of iodine is well known and firmly established. Iodine in a nascent state is known to be extremely more active than ordinary free iodine. The value of the new antiseptic is based upon the continuous liberation of nascent iodine over an extended period when the antiseptic containing ethylene iodide is applied to the tissue.

The antiseptic prepared as set forth above has been found to contain substantially 3% iodine. Substantially 25% iodine was passed over during the distillation step of the process and the same amount embodied in the subsequent distillate, from which it will be understood that the new antiseptic contains a great amount of combined iodine. A large proportion of this combined iodine has been found to be present in the form of ethylene iodide, and some propylene iodine is present as well as other olefin iodides.

What I claim is:

1. The herein described method which consists in vaporizing a solvent in the presence of an excess of iodine, and condensing the combined vapors.

2. The herein described method which consists in distilling a solvent in the presence of iodine and under reflux conditions to obtain varying degrees of concentration.

3. The herein described method which consists in distilling a solvent in the presence of an excess of iodine and under reflux conditions to obtain varying degrees of concentration.

4. The hereindescribed method which consists in vaporizing a solvent in the presence of an excess of iodine, and condensing the combined vapors, replacing the lost solvent, and maintaining an excess of iodine.

5. The herein described method which consists in vaporizing iodine crystals and a solvent, and condensing the combined vapors.

6. The herein described method which consists in vaporizing iodine crystals and a solvent, maintaining an excess of iodine, and condensing the combined vapors.

7. The herein described method which consists in distilling a solvent in the presence of free iodine, and continuing the distillation of the distillate to obtain varying degrees of concentration.

8. The herein described method which consists in distilling a solvent in the presence of an excess of free iodine, and continuing the distillation of the distillate in the presence of an excess of free iodine to obtain varying degrees of concentration.

9. The herein described method which consists in vaporizing iodine crystals and a solvent, condensing the combined vapors, and adding glycerine to the distillate.

10. An antiseptic containing ethylene iodide.

11. An antiseptic containing ethylene iodide and free iodine.

12. An antiseptic solution containing ethylene iodide and free iodine.

13. An antiseptic solution containing ethylene iodide.

14. An antiseptic alcoholic solution containing ethylene iodide.

15. The hereindescribed method which consists in vaporizing iodine crystals and alcohol, and condensing the combined vapors.

16. The hereindescribed method which consists in vaporizing iodine crystals and alcohol, maintaining an excess of iodine, and condensing the combined vapors.

17. The hereindescribed method which consists in distilling alcohol in the presence of free iodine, and continuing the distillation of the distillate to obtain varying degrees of concentration.

18. The hereindescribed method which consists in distilling alcohol in the presence of an excess of free iodine, and continuing the distillation of the distillate in the presence of an excess of free iodine to obtain varying degrees of concentration.

19. The hereindescribed method which consists in vaporizing iodine crystals and alcohol, condensing the combined vapors, and adding glycerine to the distillate.

WILLIAM A. STEPHENS.